United States Patent
Patterson et al.

(10) Patent No.: US 7,188,898 B2
(45) Date of Patent: Mar. 13, 2007

(54) CHILD RESTRAINT SYSTEM COMPRISING CONTROL UNIT FOR EVALUATING HARNESS ADJUSTMENT

(75) Inventors: James F. Patterson, Greentown, IN (US); Stuart S. Sullivan, Peru, IN (US); Rodney A. Lawrence, Frankfort, IN (US); Duane D. Fortune, Lebanon, IN (US); Edward J. Wallner, Westfield, IN (US); Stephen B. Porter, Noblesville, IN (US); William W. Fultz, Carmel, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/147,149

(22) Filed: Jun. 6, 2005

(65) Prior Publication Data

US 2005/0275260 A1     Dec. 15, 2005

Related U.S. Application Data

(60) Provisional application No. 60/607,988, filed on Sep. 8, 2004, provisional application No. 60/577,546, filed on Jun. 7, 2004.

(51) Int. Cl.
*A47D 1/10* (2006.01)
*A47C 7/62* (2006.01)

(52) U.S. Cl. ............... 297/250.1; 297/217.2; 297/217.3

(58) Field of Classification Search ............ 297/250.1, 297/484, 217.3, 217.2; 340/457.1, 686.6, 340/567; 324/207.11
See application file for complete search history.

(56) References Cited

U.S. PATENT DOCUMENTS

| 4,039,224 | A | * | 8/1977 | Bauer et al. ............... 297/469 |
| 5,260,684 | A |   | 11/1993 | Metzmaker |
| 5,656,994 | A |   | 8/1997 | Heninger ............... 340/457.1 |
| 5,711,574 | A |   | 1/1998 | Barnes ............... 297/216.11 |
| 5,720,519 | A |   | 2/1998 | Barnes ............... 297/216.11 |
| 5,758,737 | A | * | 6/1998 | Brown et al. ............... 180/268 |
| 6,151,540 | A |   | 11/2000 | Anishetty ............... 701/45 |
| 6,203,059 | B1 | * | 3/2001 | Mazur et al. ............... 280/735 |
| 6,246,936 | B1 |   | 6/2001 | Murphy et al. ............... 701/45 |
| 6,272,936 | B1 |   | 8/2001 | Oreper et al. ............... 73/862.621 |
| 6,356,187 | B2 | * | 3/2002 | Jinno et al. ............... 340/438 |
| 6,371,516 | B1 |   | 4/2002 | Miyagawa ............... 280/735 |

(Continued)

FOREIGN PATENT DOCUMENTS

GB     2290505 A  *  1/1996

*Primary Examiner*—Peter M. Cuomo
*Assistant Examiner*—Sarah B. McPartlin
(74) *Attorney, Agent, or Firm*—Jimmy L. Funke

(57) ABSTRACT

The child restraint system comprises a harness that extends through one of a plurality of slots in the shell for restraining a child occupant within the child restraint system, and a control unit for determining whether the harness is properly adjusted based upon the size of the child. Belt location sensors are disposed at the slots to detect the presence of a harness belt. The child restraint system also includes temperature sensors responsive to body temperature of the child. The control unit processes the signals from the belt location sensors and the proximity sensors and issues an alert signal if the belt location is not the recommended belt location based upon the size of the child.

20 Claims, 2 Drawing Sheets

U.S. PATENT DOCUMENTS

| | | | |
|---|---|---|---|
| 6,438,476 B1 | 8/2002 | Gray et al. ..................... | 701/45 |
| 6,490,936 B1 | 12/2002 | Fortune et al. ......... | 73/862.581 |
| 6,554,318 B2 | 4/2003 | Kohut et al. .............. | 280/801.1 |
| 6,578,871 B2 | 6/2003 | Gray et al. .................. | 280/735 |
| 6,587,770 B1 | 7/2003 | Gray et al. ................... | 701/45 |
| 6,605,877 B1 | 8/2003 | Patterson et al. ........... | 307/10.1 |
| 6,644,689 B2 | 11/2003 | Murphy ...................... | 280/735 |
| 6,650,978 B1 | 11/2003 | Patterson et al. ............. | 701/35 |
| 6,662,094 B2 | 12/2003 | Murphy et al. ............... | 701/45 |
| 6,683,534 B2 | 1/2004 | Patterson et al. ........... | 340/436 |
| 6,749,038 B2 | 6/2004 | Sullivan et al. ............. | 180/268 |
| 6,796,192 B2 | 9/2004 | Sullivan et al. ........ | 73/862.391 |
| 6,812,844 B1 | 11/2004 | Burgess .................... | 340/573.1 |
| 6,818,842 B2 | 11/2004 | Gray et al. .................. | 177/144 |
| 6,847,302 B2 | 1/2005 | Flanagan et al. ........... | 340/666 |
| 6,850,825 B2 | 2/2005 | Murphy et al. ................ | 701/45 |
| 6,851,503 B2 | 2/2005 | Almaraz et al. ............ | 180/268 |
| 6,854,415 B2 | 2/2005 | Barnes et al. ............. | 116/67 R |
| 2005/0030188 A1 | 2/2005 | Flanagan et al. ........... | 340/667 |

\* cited by examiner

CHILD RESTRAINT SYSTEM COMPRISING CONTROL UNIT FOR EVALUATING HARNESS ADJUSTMENT

CROSS REFERENCE TO RELATED APPLICATION

This application claims the benefits of U.S. Provisional Application No. 60/577,546, filed Jun. 7, 2004, and U.S. Provisional Application No. 60/607,988, filed Sep. 8, 2004, which are incorporated herein by reference.

This application is also related to the following United States patent applications filed contemporaneously herewith: CHILD RESTRAINT SYSTEM AND METHOD FOR MONITORING INSTALLATION OF THE CHILD RESTRAINT SYSTEM, Ser. No. 11/147148; CHILD SEAT AND MONITORING SYSTEM, Ser. No. 11/146927; CHILD SEAT AND MONITORING SYSTEM, Ser. No. 11/146928; CHILD SEAT MONITORING SYSTEM AND METHOD FOR DETERMINING A TYPE OF CHILD SEAT, Ser. No. 11/146939; CHILD RESTRAINT SYSTEM AND METHOD FOR MONITORING INSTALLATION OF THE CHILD RESTRAINT SYSTEM, Ser. No. 11/146926; CHILD RESTRAINT SYSTEM COMPRISING WEIGHT SENSOR, Ser. No. 11/146921. The contents of which are each incorporated herein by reference thereto.

TECHNICAL FIELD OF INVENTION

This invention relates to a child restraint system that includes a harness that extends through slots in a shell. More particularly, this invention relates to such child restraint system that includes a control unit for determining whether the harness is properly adjusted based upon the size of the child occupant.

BACKGROUND OF INVENTION

A child restraint system, also referred to as a child car seat, is used for safely transporting a child within an automotive vehicle, so as to minimize the risk of injury to the child in the event of an accident. A typical child restraint system comprises a polymeric shell defining a compartment that is sized and shaped for receiving the child. The compartment is lined with a cushion to enhance comfort. A harness is provided to restrain the child within the compartment. The harness comprises belts that extend through slots in the shell. To optimize safety, it is desired to locate the slots adjacent the shoulders of the child. As the child grows, however, the child's shoulders may extend beyond the slots, thereby reducing the effectiveness of the harness in safely restraining the child. For this reason, the child car seat commonly includes multiple sets of slots located to accommodate children of varying size. That is, the child car seat includes a first set of slots positioned proximate to the shoulders of a smaller child, and a second set of slots positioned proximate to shoulders of a larger child. One problem is that, as the child grows, the adult operator, typically a parent, may not be aware that the first slots are no longer recommended for the child and that the harness needs to be adjusted to the second slots.

Therefore, a need exists for a child restraint system that includes a control unit that determines the size of a child and the location of the harness, and alerts the parent when the harness is not properly adjusted for the child.

SUMMARY OF THE INVENTION

The child restraint system in accordance with this invention comprises a shell defining a compartment for receiving a child occupant and a harness comprising a belt for restraining the child occupant within the compartment, and further comprises a control unit for monitoring conditions for alerting a parent or other adult operator that the child restraint system is not properly adjusted for the child occupant. The belt of the harness extends through one of a plurality of slots in the shell that are located to accommodate children of varying sizes. Sensors are provided for detecting the belt within the slots. Thus, the child restraint system includes a first slot located for restraining a child of a first size, a first belt sensor for detecting the belt within the first slot and providing a first belt location sensor, a second slot located for restraining a child of a second size greater than the first size, and a second belt sensor for detecting the belt within the second slot and providing a second belt location sensor. The child restraint system also includes at least one proximity sensor for sensing a presence to a body portion of the child occupant and providing a signal indicative of the presence of the child's body adjacent to the sensor. The sensor is strategically disposed at a predetermined location relative to the first slot and the second slot to sense the child's body in proximity to the slots. The control unit is coupled to the first belt sensor, the second belt sensor and the proximity sensor and receives the first belt location signal, the second belt location signal and the child signal. The control unit processes the signals to determine a belt location based upon the first belt location signal and the second belt location signal, and a recommended belt location based upon the child signal. The control unit issues an alert signal if the belt location is not the recommended belt location. Thus, the parent or other adult operator is alerted that adjustment to the harness is needed to optimize safe transport of the child occupant.

In one aspect of this invention, a method is provided for transporting a child occupant within a child restraint system that includes a harness comprising a belt, a shell having a plurality of slots for receiving the belt and a control module. The method provides a first belt location signal to the control unit to indicate that the belt is within a first slot for restraining a child occupant having a first size and a second belt location signal to indicate that the belt is within a second slot for restraining a child occupant having a second size larger than the first size. The method also provides a child size signal that indicates a presence of a body of the child occupant at a location proximate to the first or second slots. The control unit determines a belt location based upon the first belt location signal and the second belt location signal, determine a recommended belt location based upon the child size signal, and issues an alert signal when the belt location signal is not the recommended location.

BRIEF DESCRIPTION OF DRAWINGS

This invention will be further described with reference to the accompanying drawings in which.

DETAILED DESCRIPTION OF INVENTION

Figure 1:
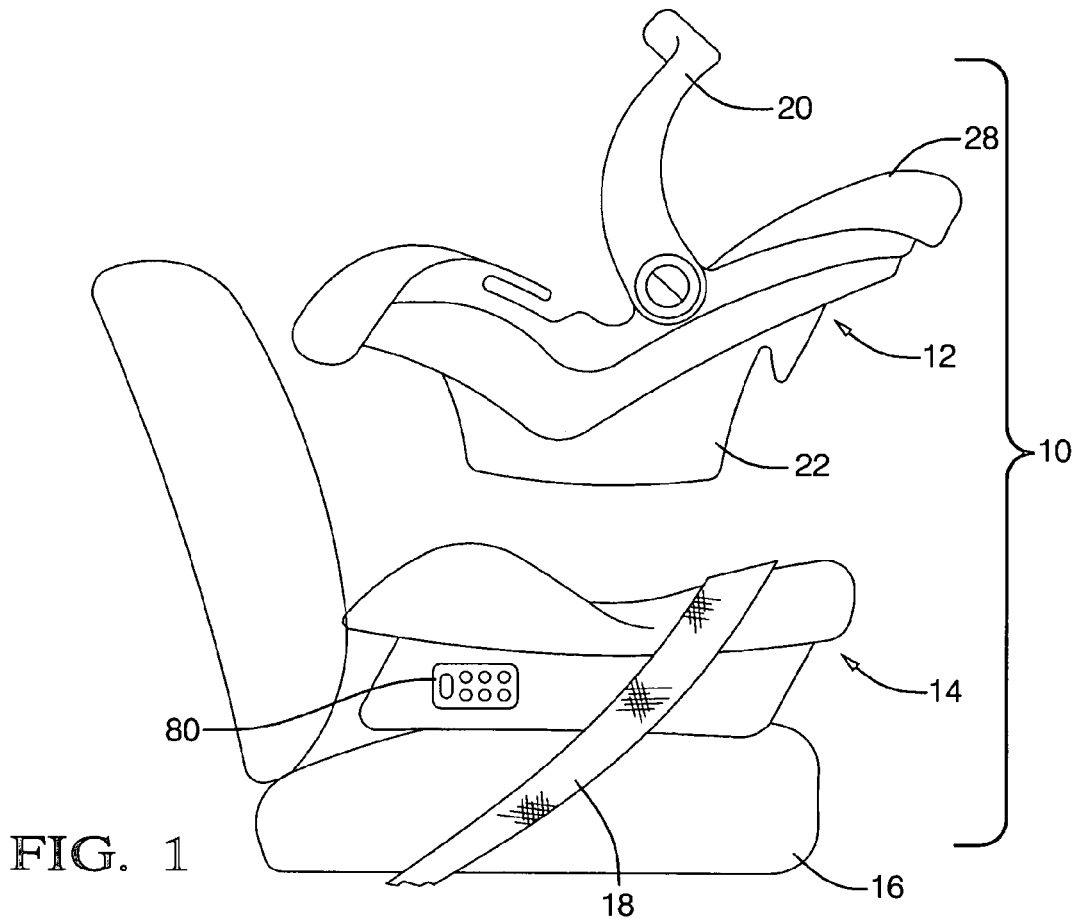
FIG. 1 is an elevational view showing a child restraint system in accordance with a preferred embodiment of this invention.
Figure 2:
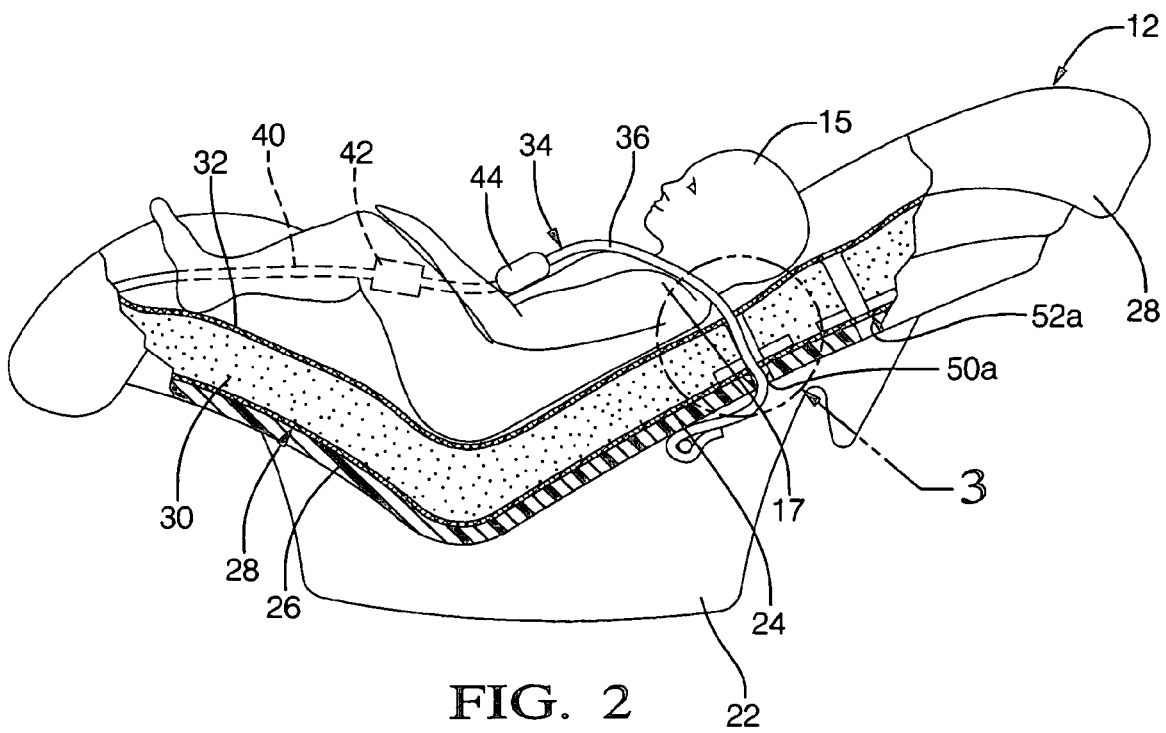
FIG. 2 is an elevational view, partially in cross-section, of the carrier in FIG. 1.

In a preferred embodiment, referring to FIGS. 1–4, a child restraint system in accordance with this invention is a rear-facing infant seat 10 that includes a carrier 12 and a base 14. Alternately, this invention may be suitably used in a forward-facing seat, a belt-positioning booster seat or other seat to assure proper selection of slots in adjustment of a harness or vehicle seat belt relative to the size of the child. In the illustrated embodiment, base 14 is installed in a rear seat 16 of a vehicle and secured by the vehicle seat belt 18 and optionally one or more additional tethers (not shown) that attach to the vehicle structure. The base is intended to remain in the vehicle for an extended period, typically until the child has outgrown the recommended size range for seat 10.

Carrier 12 is adapted to accommodate a child 15 for transport both inside and outside the vehicle. Accordingly, carrier 12 securely couples to base 14 for transporting a child within the vehicle, but may be disengaged from base 14 for carrying the child outside the vehicle. A handle 20 is provided to facilitate transport outside the vehicle. A suitable infant seat comprising a carrier and a base is commercially available from Graco Children's Products, Inc. under the trade designation Snugride.

Carrier 12 comprises a shell 22 formed of a rigid polymeric material and defining a compartment for sized and shaped for receiving the child. The shell includes a back portion 24 that supports the back of the child and a lower body portion 26 that supports the buttocks and legs of the child. The compartment is lined with a cushion 28 that comprises a polymeric foam mat 30 and a cloth cover 32 to enhance child comfort.

Carrier 12 also includes a harness 34 for restraining the child within the carrier. A suitable harness includes shoulder belts 36 and 38 and a lower belt 40. A buckle 42 connects shoulder belts 36 and 38 to lower belt 40 for securing the harness about the child. A harness clip 44 includes portions attached to shoulder belts 36 and 38 that snap together to position the shoulder belts across the chest of the child. Although not shown, it will be understood that each belt commonly includes two straps and a fastener attached to one strap and having an opening through which the other strap is looped, whereby the length of the belt may be adjusted about the body of the child.

Figure 3:
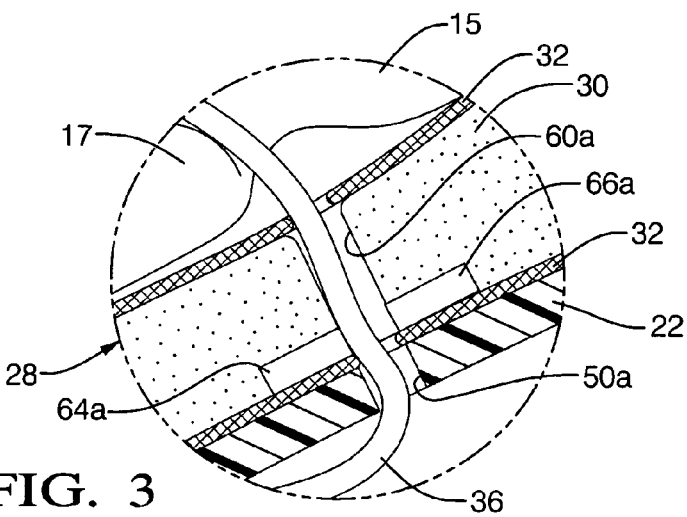
FIG. 3 is a cross sectional view of a portion of FIG. 2 indicated by circle 3.

The belts extend through slots 50a, 50b, 52a and 52b in carrier 22 and corresponding slit openings in cushion 28. Referring to FIG. 3, there is depicted an arrangement of shoulder belt 36 in slot 50a. Belt 36 is anchored to the back of shell 22 and extends through slot 50a in the shell, and though an opening 60a through mat 30 and cloth cover 32 of cushion 28. Slot 50a is bordered by an optical emitter 64a that emits light and an optical receiver 66a that is adapted to receive the light. In the absence of a belt through the slot, receiver 66a detects the light from emitter 64a and outputs an electrical signal in response to the detection of light. However, the presence of the belt through the slot blocks the light path from emitter 64a to receiver 66a, whereupon receiver 66a does not detect the light and outputs an electrical signal indicating that no light is detected. Thus, in this embodiment, emitter 64a and receiver 66a cooperate to form a belt location sensor to detect the presence of the belt through the slot. Alternately, the presence of the belt through the slot may be detected by an electrical switch, a force sensor or another suitable sensor that responds to contact with the belt.

Similarly, slot 50b registers with a corresponding opening in the cushion and is bordered by optical emitter 64b and optical receiver 66b. Slots 52a and 52b similarly register with openings in the cushion. Optionally, optically emitters and optical detectors may be disposed about slots 52a and 52b to provide belt location sensors for these slots.

To optimize safe restraint of the child in the seat, particularly in the event of a vehicle accident, it is desired to locate the slots proximate to the shoulders 17 of child 15. Multiple slots are provided to allow the belts to be properly positioned depending upon the size of the child. Thus, slots 50a and 52a are located to positions belts 36 and 38, respectively, adjacent the shoulders of a child having a first, smaller size, as illustrated in the Figs. Slots 50b and 52b are located to position belts 36 and 38, respectively, adjacent the shoulders of a child having a second, larger size. Multiple slots may also be provided for belt 40 to position the belt properly to accommodate a smaller or larger child.

Seat 10 also includes an array of temperature sensors 68a, b, c, d, e, and f. A preferred temperature sensor is a thermistor having an electrical output signal indicative of the temperature at the location of the sensor. While in the described embodiment temperature sensors a employed, this invention may be suitable carried out using other types of sensors to indicate the proximity of a portion of the body of the child to location of the sensor. Suitable proximity sensors may include pressure sensors responsive to pressure exerted by the child at the location. For a location near the child's shoulders, a temperature sensor is preferred to provide a reliable signal and avoid fluctuations in signal due to low or variable pressure attributable to the shoulders.

In this embodiment, seat 10 is equipped with a control module 80 that monitors conditions pertaining to the installation or features of the seat, including the location of the harness belts. In this embodiment, control module 80 is mounted in base 14 and connected to sensors and related elements in carrier 12 by a wire harnesses that includes wires 82, using a plug and socket to allow the carrier to be detached from the base. Alternately, sensors in the carrier may be coupled to one or more transmitters that transmit radio frequency signals, and control unit 80 may include a receiver for receiving the signals, to allow wireless communication therebetween. In an alternate embodiment, the control module may be mounted in the carrier and, if desired, coupled to sensors in the base.

Control module 80 is electrically coupled to a display 84 that comprises an activation button 87, a series of lights 86a, b and c, such as green lights, that confirm proper adjustment of seat 10, and a series of lights 88a, b and c, such as red lights, that provide a warning of improper adjustment of the seat. By way of an example, display 84 includes a green light 86a that confirms that the harness is properly adjusted for the size of the child and a red light 88a that alerts the parent or other adult operator that the harness is not properly adjusted for the size of the child. While in this embodiment the control unit provides an alert signal that activates a light, the alert signal may activate an audible alert, such as a chime or buzzer, optionally in combination with the signal light. Alternately, the readable display, such as a liquid crystal display, may be used to provide a descriptive alert.

Figure 4:
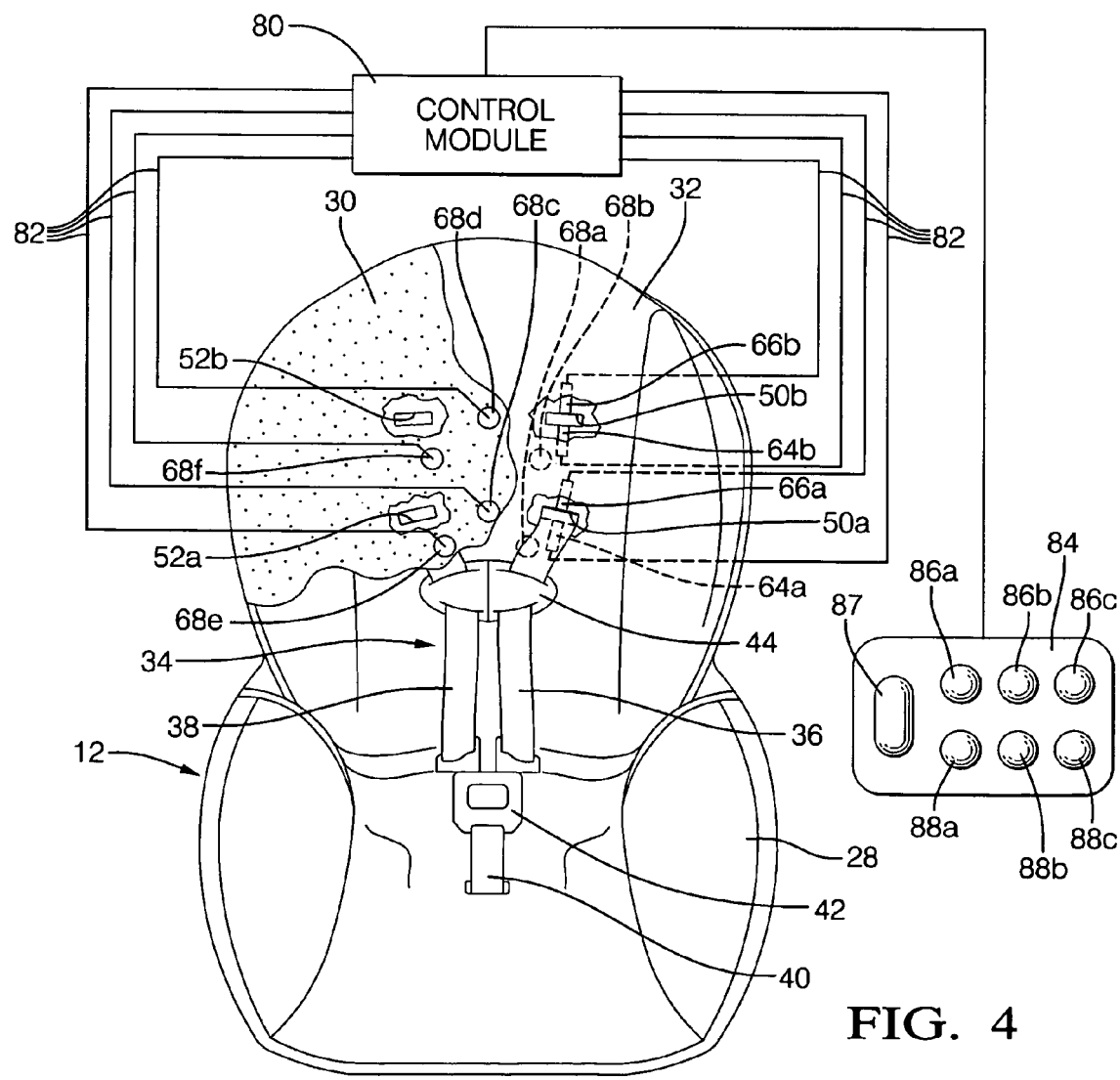
FIG. 4 is a plan view of the carrier in FIG. 2.

Referring particularly to FIG. 4, it is seen that sensors 68a-f are strategically located for sensing the size of the child relative to slots 50a–b and 52a–b. In this embodiment, it is desired that belts 36 and 38 be positioned adjacent the shoulders 17 of child 15 in the carrier. In order to accommodate children of varying size, it is recommended that belts 36 and 38 are located through slots 50a and 52a for a child of a first, smaller size, and through slots 50b and 52b for a child of a second, larger size. Sensors 68a and 68e are located proximate to and below slots 50a and 52a, respectively, and sense body temperature attributable to the shoulders of the child adjacent the slots. Sensors 68b and 68f are located proximate to and below slots 50b and 52b, respectively, and sense body temperature attributable to the shoulders of the child adjacent these slots. Sensor 68c is located between slots 50a and 52a and senses body temperature attributable to the head of a smaller child, whereas sensor 68d is located between slots 50b and 52b and senses body temperature attributable to the head of a larger child. The locations of sensor 68b intermediate slots 50a and 50b and sensor 68f intermediate slots 52a and 52b are particularly significant, since the locations allow the sensors to sense body temperature of a larger child but not a smaller child, and thereby provides an effective basis to discriminate a smaller child from a larger child.

The control module receives electrical signals form the optical receivers 66a and 66b and temperature sensors 68a–f and processes the signal to determine proper or improper adjustment of harness 34. When a child is placed into carrier 12, and carrier 12 is assembled into base 14, the control module initiates an evaluation of the child size and the harness belt locations. This may be in response to an adult operator, typically a parent, pressing an activation button 87 in display 84. Alternately, the start step may be initiated in response to a signal from an interlock switch activated when the carrier is assembled to the base. The control module then analyzes the signals from optical receivers 66a and 66b and determines whether belt 36 is located in slot 50a or 50b. Optionally, for a seat 10 comprising belt location sensors at slots 52a and 52b, the control module analyzes the signals from the receivers and determines whether belt 38 is located in slot 52a or 52b.

The control module then analyzes the temperature signals from temperature sensors 68a–f to determine the size of the child. If the signals indicate a body temperature at sensors 68a and 68e but not at sensors 68b and 68f, then the control module determines that the child is characterized by the first, smaller size. If the signals indicate a body temperature at sensors 68b and 68f, then the control module determines that the child is characterized by the second, larger size. It is noted that, for a larger child, sensors 68a and 68e may also sense body temperature, thereby confirming the position of the child within the seat.

The control module then compares the location of belt 36 and the size of the child, and issues an alert signal. If the child is a smaller size and belt 36 is located in slots 50a, then the control module provides an alert signal to illuminate green light 86a on display 84, thereby informing the adult operator that the harness is properly adjusted. Similarly, if the child is a larger size and belts 36 is located in slots 50b, then an alert signal also illuminates green light 86a. In contrast, if the child is a smaller size and belt 36 is located in slot 50b, then the control module provides an alert signal to illuminate red light 86b on display 84, to advise the adult operator that adjustment to the location of the harness is recommended. Similarly, if the child is a larger size and belt 36 is located in slot 50a, then the alert signal also illuminates red light 86b to recommend adjustment to the harness. For a seat 10 comprising belt location sensors at slots 52a and 52b, the control module similarly analyzes the signals and determines whether belt 38 is located in the recommended proper slot.

Therefore, this invention provides a child restraint system for an automotive vehicle that includes a harness for restraining a child and a control module that informs an adult operator whether the harness is properly adjusted based upon the size of the child. In a preferred embodiment, this is accomplished using sensors, such as optical sensors and thermistors, that are inexpensive and reliable in an automotive environment. By assuring proper harness adjustment, the safety of the child occupant during transport is enhanced, particularly in the event of an accident.

While this invention has been described in terms of the preferred embodiments thereof, it is not intended to be so limited, but rather only to the extent set forth in the claims that follow.

We claim:

1. A child restraint system for transporting a child occupant within an automotive vehicle, said child having a body within a recommended size range, comprising:
   a harness for restraining the child occupant within the child restraint system, said harness comprising a belt;
   a shell defining a compartment for receiving the child occupant; said shell comprising a first slot positioning said belt for restraining a child having a first size and a second slot for positioning said belt for restraining a child having a second size greater than said first size;
   a first belt sensor for detecting said belt within the first slot and providing a first belt location signal;
   a second belt sensor for detecting said belt within said second slot and providing a second belt location signal;
   at least one proximity sensor for sensing a presence of the body of the child occupant and providing a child size signal indicative of the presence of the body adjacent to the at least one proximity sensor, said proximity sensor being disposed at a predetermined location relative to one of said first slot and said second slot to sense the body in proximity thereto; and
   a control unit coupled to the first belt sensor, the second belt sensor and the proximity sensor for receiving the first belt location signal, the second belt location signal and the child size signal, said control unit adapted to determine a belt location based upon the first belt location signal and the second belt location signal, to determine a recommended belt location based upon the child size signal, and to issue an alert signal if the belt location is not the recommended belt location.

2. A child restraint system in accordance with claim 1 wherein the first slot is located for positioning the belt adjacent a child having a first size and the second slot is for positioning the belt adjacent a child of a second size.

3. A child restraint system in accordance with claim 1 wherein the first belt sensor and the second belt sensor comprise optical sensors.

4. A child restraint system in accordance with claim 1 wherein the first belt sensor and the second belt sensor are pressure sensors responsive to contact with the belt.

5. A child restraint system in accordance with claim 1 wherein the proximity sensor is a temperature sensor.

6. A child restraint system in accordance with claim 1 wherein the alert signal activates a display light.

7. A child restraint system in accordance with claim 1 wherein the alert signal activates an audio device.

8. A child restraint system for transporting a child occupant within an automotive vehicle, said child occupant having a body within a recommended size range that includes a first size and a second size greater than said first size, comprising:
   a harness for restraining the child occupant within the child restraint system, said harness comprising a belt;

a shell defining a compartment for receiving the child occupant; said shell comprising a plurality of slots for receiving said belt, said plurality of slots comprising a first slot for positioning the belt adjacent to a shoulder of a child having the first size and a second slot for positioning the belt adjacent to a shoulder of a child having the second size;

a first belt sensor for detecting said belt within the first slot and providing a first belt location signal;

a second belt sensor for detecting said belt within said second slot and providing a second belt location signal;

a plurality of temperature sensors for providing temperature signals in response to the body of the child occupant, said plurality of temperature sensors comprising a first temperature sensor proximate to the first slot and providing a first temperature signal indicative of the body of the child occupant proximate to first temperature sensor and a second temperature sensor proximate to the second slot and providing a second temperature signal indicative of the body of the child occupant proximate to second temperature sensor, and a control unit coupled to the first belt sensor, the second belt sensor and the temperature sensors for receiving the first belt location signal, the second belt location signal and the temperature signals, said control unit adapted to determine a belt location based upon the first belt location signal and the second belt location signal, to determine a recommended belt location based upon the temperature signals, and issuing an alert signal if the belt location is not the recommended belt location.

9. A child restraint system in accordance with claim 8 wherein the child restraint system comprises a cushion lining the compartment, and wherein the temperature sensors are disposed within the cushion and connected to the control unit by a wiring harness.

10. A child restraint system in accordance with claim 8 wherein the temperature sensors are thermistors.

11. A child restraint system in accordance with claim 8 wherein the second temperature sensor is located intermediate the first slot and the second slot.

12. A child restraint system in accordance with claim 8 wherein the first temperature sensor is located for sensing a body portion of a child occupant below the first slot, and wherein the second temperature sensor is located for sensing a body portion of a child occupant below the second slot.

13. A child restraint system in accordance with claim 8 wherein the control unit determines if the body of the child occupant extends beyond the first slot based upon the first and second temperature signals, determines if the belt extends through the first slot based upon the first belt location signal, and provides an alert if the body extends beyond the first slot and the belt extends through the first slot.

14. A method of transporting a child occupant within a child restraint system, said child restraint system comprising harness comprising a belt, a shell having a plurality of slots for receiving said belt based upon a size of the child, and a control module, said method comprising:

providing a first belt location signal to said control unit indicative of the belt within a first slot, said first slot being located for positioning said belt for restraining a child occupant of a first size, providing a second belt location signal to said control unit indicative of the belt within a second slot, said second slot being located for positioning said belt for restraining a child occupant of a second size larger than said first size, providing a child size signal to said control unit indicative of the presence of a body of a child occupant proximate to one of said first slot and said second slot;

determining, by said control unit, a belt location based upon said first belt signal and said second belt signal;

determining a recommended belt location based upon child size signal; and providing an alert signal when the belt location is not the recommended location.

15. A method in accordance with claim 14 further comprising locating said first slot at a location for positioning the belt adjacent to a shoulder of a child occupant having the first size; and locating the second slot at a location for positioning the belt adjacent to a shoulder of a child occupant having the second size.

16. A method in accordance with claim 14 wherein the first belt location signal is an electrical signal produced by an optical sensor located at the first slot, and said second belt location signal is an electrical signal produced by an optical sensor at the second slot.

17. A method in accordance with claim 14 further comprising providing a temperature sensor at a location relative to the first slot and the second slot to provide a child size signal.

18. A method in accordance with claim 14 further comprising illuminating a display light in response to said alert signal.

19. A method in accordance with claim 14 wherein the alert signal activates an audio device.

20. A method in accordance with claim 14 further comprising providing a plurality of signals from temperature sensors responsive to body temperature of a child occupant and strategically located relative to said first slot and said second slot for discriminating between a child occupant of the first size and a child occupant of the second size.

* * * * *